United States Patent
Lev

(10) Patent No.: US 8,951,661 B2
(45) Date of Patent: Feb. 10, 2015

(54) BATTERY DESIGN

(75) Inventor: Leonid C. Lev, West Bloomfield, MI (US)

(73) Assignee: GM Globabl Technology Operations LLC, Detroit, MI (US)

( * ) Notice: Subject to any disclaimer, the term of this patent is extended or adjusted under 35 U.S.C. 154(b) by 738 days.

(21) Appl. No.: 13/216,635

(22) Filed: Aug. 24, 2011

(65) Prior Publication Data
US 2013/0052517 A1 Feb. 28, 2013

(51) Int. Cl.
| | |
|---|---|
| *H01M 2/24* | (2006.01) |
| *H01M 2/26* | (2006.01) |
| *H01M 4/13* | (2010.01) |
| *H01M 4/66* | (2006.01) |
| *H01M 10/04* | (2006.01) |
| *H01M 10/0525* | (2010.01) |
| *H01M 10/0585* | (2010.01) |

(52) U.S. Cl.
CPC ............... *H01M 2/26* (2013.01); *H01M 2/266* (2013.01); *H01M 4/13* (2013.01); *H01M 4/661* (2013.01); *H01M 10/0413* (2013.01); *H01M 10/0525* (2013.01); *H01M 10/0585* (2013.01); *H01M 2220/20* (2013.01); *Y02E 60/122* (2013.01); *Y02T 10/7011* (2013.01)
USPC ............................ 429/160; 429/149; 429/158

(58) Field of Classification Search
CPC ......... H01M 2/26; H01M 2/266; H01M 4/13; H01M 4/661; H01M 10/0525; H01M 10/0585; H01M 10/0413; H01M 2220/20; Y02T 10/7011; Y02E 60/122
USPC ........................................................ 429/160
See application file for complete search history.

(56) References Cited

U.S. PATENT DOCUMENTS

| | | | |
|---|---|---|---|
| 5,584,109 A | 12/1996 | DiGiovanni et al. | |
| 7,541,112 B2 | 6/2009 | Richard et al. | |
| 2005/0233209 A1 | 10/2005 | Sudano et al. | |
| 2008/0008927 A1 * | 1/2008 | Lee et al. | ........................ 429/61 |

FOREIGN PATENT DOCUMENTS

| | | | |
|---|---|---|---|
| JP | 2006185733 A | * | 7/2006 |
| WO | 2006114993 A1 | | 11/2006 |

OTHER PUBLICATIONS

Loyns, A.C. et al., "Bipolar batteries based on Ebonex technology," J. of Power Sources 144, pp. 329-337, 2005.
Chami, M. et al., "Li-Ion Bipolar Batteries for HEV Applications," Meet. Abstr. MA2008-02 552 (copyright 2008 ECS—The Electrochemical Society), 2 pgs.
Russell, P.G. et al, "High rate lithium/thionyl chloride bipolar battery development," J. of Power Sources 54, pp. 180-185, 1995.
Neelameggham, N.R., "The Use of Magnesium in Lightweight Lithium-Ion Battery Packs," JOM, Apr. 2009, pp. 58-60.

* cited by examiner

*Primary Examiner* — Gary Harris
(74) *Attorney, Agent, or Firm* — Brooks Kushman P.C.

(57) ABSTRACT

A battery assembly includes a plurality of compound electrodes and electrolyte. Each compound electrode includes an anode section and a cathode section. The compound electrodes are arranged such that the anode section of a first compound electrode interacts electrochemically with the cathode section of a second compound electrode with the electrochemical interaction being carried through electrolyte disposed between the plurality of compound electrodes.

7 Claims, 6 Drawing Sheets

BATTERY DESIGN

TECHNICAL FIELD

The present invention relates to battery designs and in particular, lithium ion battery designs having a plurality of battery sections arranged in series.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important. Lithium ion batteries are an important type of battery technology.

Most battery assemblies, including lithium ion battery assemblies, include a plurality of individual electrochemical cells. FIG. 1A provides a schematic cross section of an electrochemical cell that is used in many prior art battery assemblies. Electrochemical cell 10 includes anode 12 and cathode 14. Typically, anode 12 includes a metal sheet or foil 16 (usually copper metal) over-coated with graphitic layer 18. Similarly, cathode 14 includes metal sheet or foil 20 (usually aluminum metal) over-coated with a lithium-containing layer 22. Finally, electrochemical cell 10 includes electrolyte 24 which is interposed between anode 12 and cathode 14. Terminals 26 and 28 allow the generated electricity to be used in an external circuit.

Electrochemical cells produce electricity via an electrochemical reaction. In the case of lithium ion battery cells, an example of the electricity generating reactions are described by the following formulae:

Cathode Reaction: $LiMO_2 \rightleftharpoons Li_{1-x}MO_2 + xLi^+ + xe$

Anode Reaction: $C + xLi^+ + xe \rightleftharpoons Li_xC$

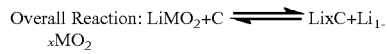
Overall Reaction: $LiMO_2 + C \rightleftharpoons Li_xC + Li_{1-x}MO_2$ where $LiMO_2$ is a lithiated transition metal oxide. Other materials may be used as a cathode and anode of a li-ion cell, resulting in different electricity generating reactions.

The reactions occurring in a lithium ion battery cell are reversible, thereby providing the ability of such cells to be recharged. During battery discharge, the anode provides electrons to an external circuit and lithium ions to the electrolyte from lithium that is intercalated within the graphitic coating on the anode. During charging the movement of the lithium ions is reversed.

FIG. 1B provides a schematic cross section of a prior art battery assembly that includes a plurality of electrochemical cells. Battery assembly 30 includes electrochemical cells 32-56 which are of the basic design set forth in FIG. 1A. In this design, active elements of the internal electrodes (anode or cathode) are deposited on both sides of current carriers 58, 59. Moreover, in accordance with this design the electrochemical cells are arranged in a parallel configuration with the anodes of each cell electrically connected together and the cathodes of each cell electrically connected together. Thus the voltage generated between the electrodes of the battery assembly 30 is the same as the voltage generated between the electrode of the battery assembly 10.

FIG. 1C provides a schematic cross section of a prior art battery assembly formed from a plurality of battery subassemblies arranged in a parallel configuration. Battery assembly 60 includes battery subassemblies 62-66 which are of the general design of the battery assembly set forth in FIG. 1B. In accordance with this design, the battery subassemblies are arranged in a parallel configuration with the anodes of each battery subassembly electrically connected together and the cathodes of each battery subassembly electrically connected together. Thus the voltage generated between the electrodes of the battery assembly 60 is the same as the voltage generated between the electrodes of the battery assembly 10 and the voltage generated between the electrodes of the battery assembly 30.

FIG. 1D provides a schematic cross section of a prior art battery assembly formed from a plurality of battery subassemblies arranged in a series configuration. Battery assembly 70 includes battery subassemblies 72-76 which are of the general design of the battery assembly set forth in FIG. 1B or in FIG. 1C. In accordance with this design, the battery subassemblies are arranged in series with the anode of a battery subassembly electrically connected to the cathode of the next battery subassembly.

Although the battery assemblies of FIGS. 1A-1D work reasonably well, improved designs that are easier to assemble are still desirable. In particular, there is a desire to decrease the costs associated with fabricating high capacity battery assemblies for automotive applications.

Accordingly, there is a need for battery assemblies of simpler design that are more economical that the current prior art assemblies.

SUMMARY OF THE INVENTION

The present invention solves one or more problems of the prior art by providing in at least one embodiment a battery assembly. The battery assembly includes a plurality of compound electrodes and electrolyte. Each compound electrode includes an anode section and a cathode section. The compound electrodes are arranged such that the anode section of a first compound electrode interacts electrochemically with the cathode section of the second compound electrode. The electrochemical interaction carried through electrolyte disposed between the plurality of compound electrodes.

In another embodiment, a battery assembly comprising a plurality of battery sections and compound electrodes is provided. Each battery section includes a first compound electrode plate and a second compound electrode plate. The first compound electrode plate and the second compound electrode plate each individually include a copper plate and an aluminum plate with the copper plate being attached to the aluminum plate. The copper plate defines an anode section and is coated with an anode active layer. The aluminum plate defines a cathode section and is coated with a cathode active layer. The first compound electrode plate and the second compound electrode plate are arranged such that the anode section of the first compound electrode plate aligns with the cathode section of the second compound electrode plate. Finally, an electrolyte is disposed between the first compound electrode plate and the second compound electrode plate.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1A:
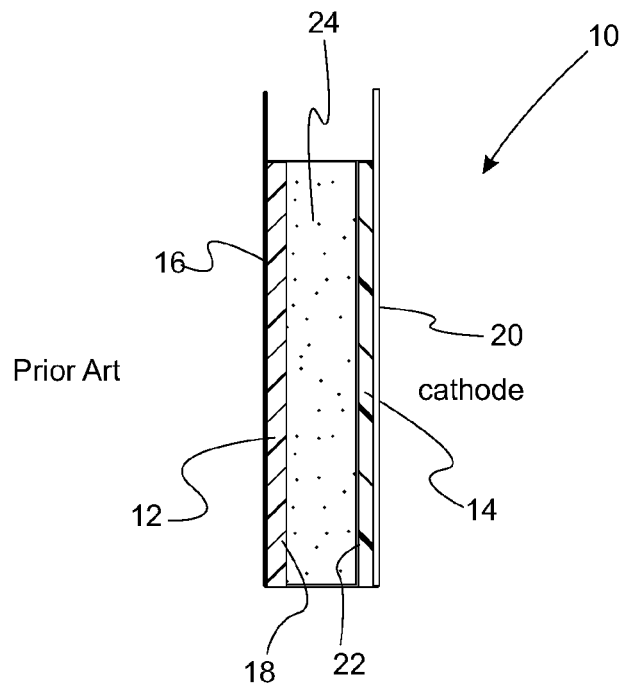
FIG. 1A is a schematic cross section of an electrochemical cell that is used in many prior art battery assemblies.
Figure 1B:
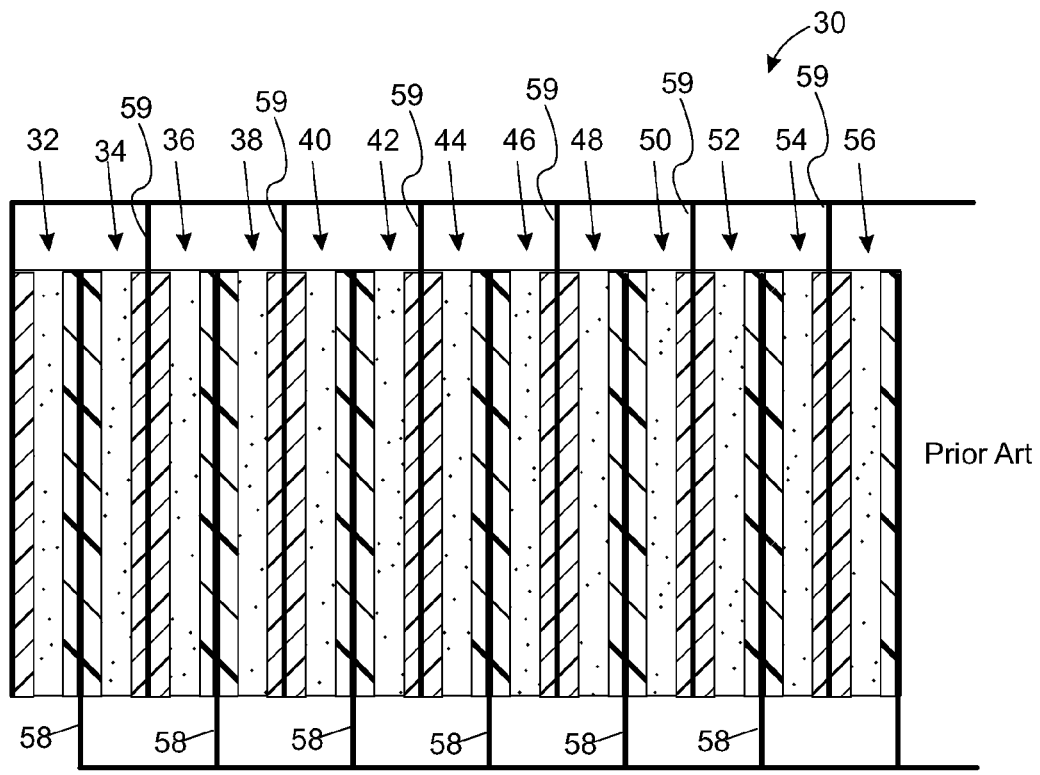
FIG. 1B is a schematic cross section of a prior art battery assembly that includes a plurality of electrochemical cells.
Figure 1C:
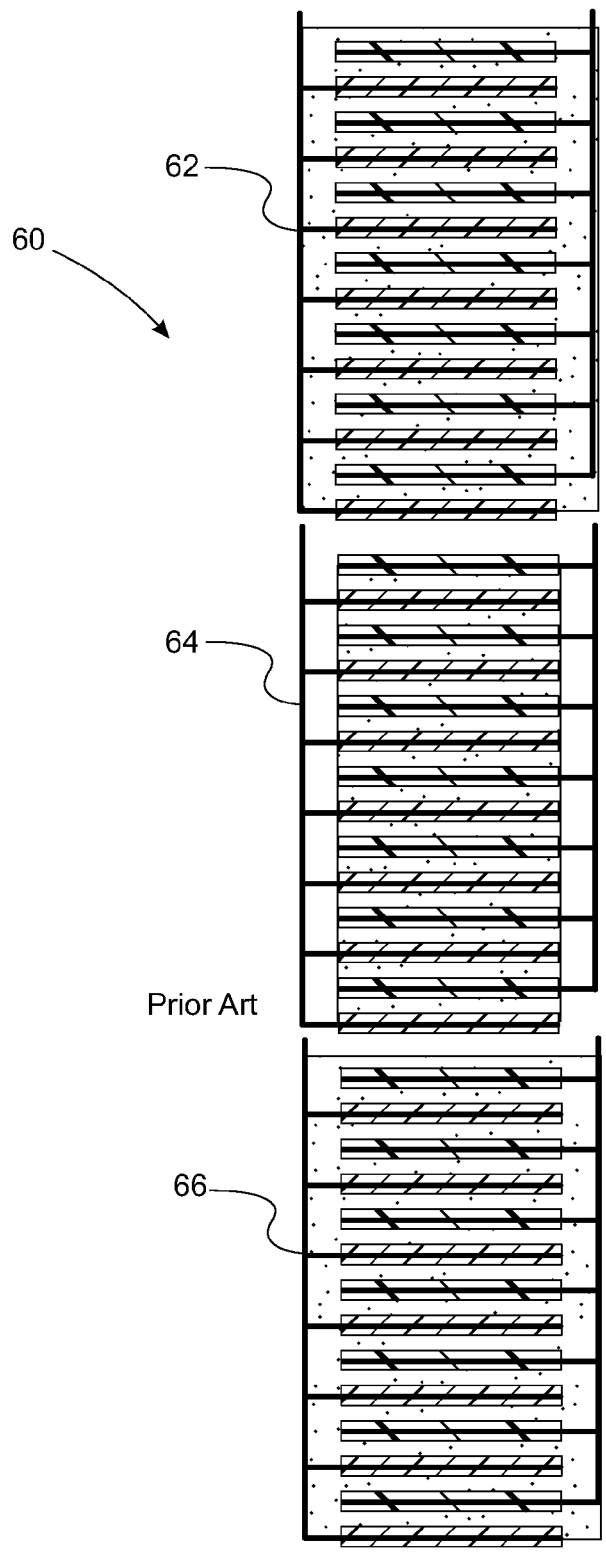
FIG. 1C is a schematic cross section of a prior art battery assembly formed from a plurality of battery subassemblies arranged in a parallel configuration.
Figure 1D:
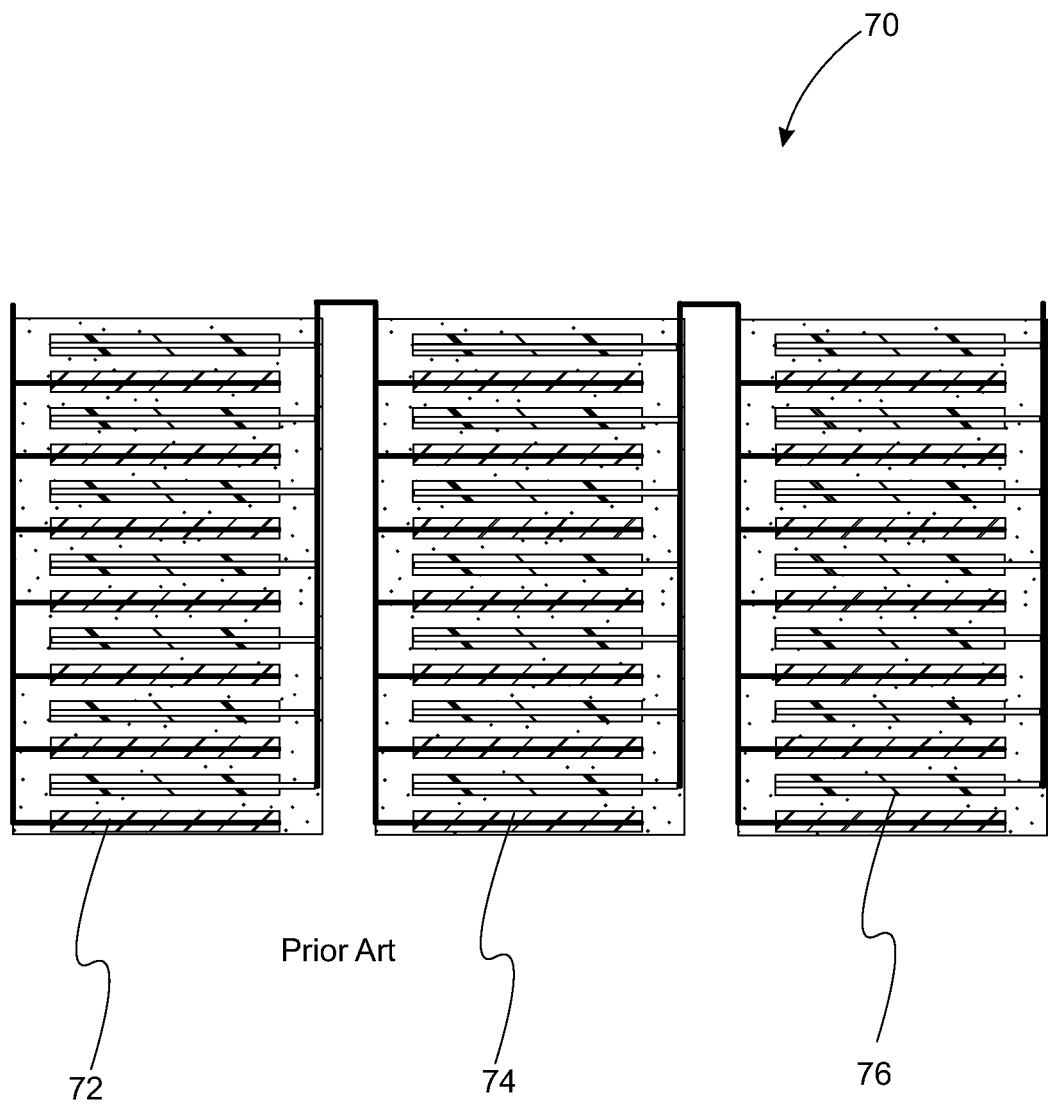
FIG. 1D is a schematic cross section of a prior art battery assembly formed from a plurality of battery subassemblies arranged in a series configuration.
Figure 2A:
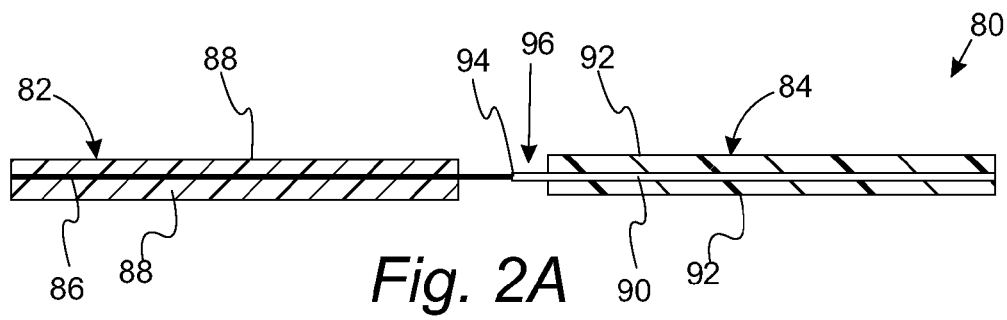
FIG. 2A is a variation in which both sides of the anode and both sides of the cathode are coated with an electrode active layer.

With reference to FIGS. 2A to 2D, variations of compound electrodes for use in a battery assembly are provided. FIG. 2A is a schematic cross section of a variation in which both sides of the anode and both sides of the cathode are coated with an electrode active layer. An electrode active layer is a layer that assists in the electrochemical process occurring at the electrode. Such assistance can be providing a surface for intercalation of ions (e.g., Li ions) or promotion of the chemical reactions occurring at an electrode. Compound electrode 80 includes anode section 82 and cathode section 84. Anode section 82 includes anode metal sheet 86 over-coated with anode active layer 88 on both sides. Cathode section 84 includes cathode metal sheet 90 over-coated with cathode active layer 92 on both sides. Metal sheets 86 and 90 are attached together (e.g., by welding) at position 94 to form compound metal sheet 96.

Figure 2B:
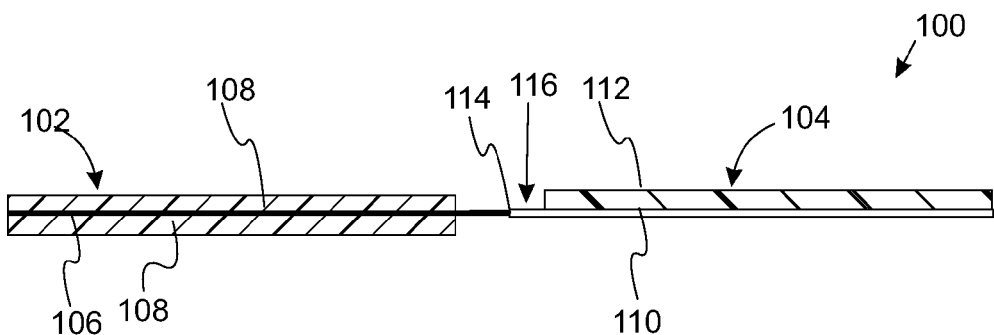
FIG. 2B is a variation in which both sides of the anode and single side of cathode are coated with an electrode active layer.

FIG. 2B provides a variation in which both sides of the anode and a single side of the cathode are coated with an electrode active layer. Compound electrode 100 includes anode section 102 and cathode section 104. Anode section 102 includes anode metal sheet 106 over-coated with anode active layer 108 on both sides. Cathode section 104 includes cathode metal sheet 110 over-coated with cathode active layer 112 on a single side. Metal sheets 106 and 110 are attached together (e.g., by welding) at position 114 to form compound metal sheet 116.

Figure 2C:
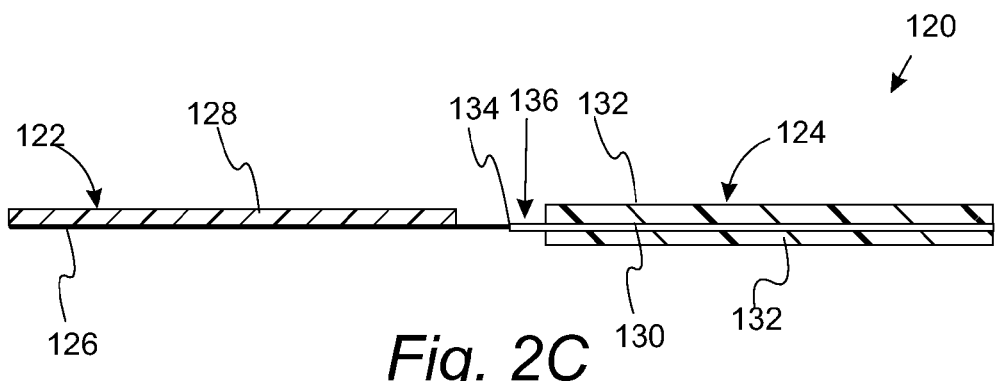
FIG. 2C is a variation in which a single side of the anode and both sides of cathode are coated with an electrode active layer.

FIG. 2C provides a variation in which a single side of the anode and both sides of the cathode are coated with an electrode active layer. Compound electrode 120 includes anode section 122 and cathode section 124. Anode section 122 includes anode metal sheet 126 over-coated with anode active layer 128 on a single side. Cathode section 124 includes cathode metal sheet 130 over-coated with cathode active layer 132 on both sides. Metal sheets 126 and 130 are attached together (e.g., by welding) at position 134 to form compound metal sheet 136.

Figure 2D:
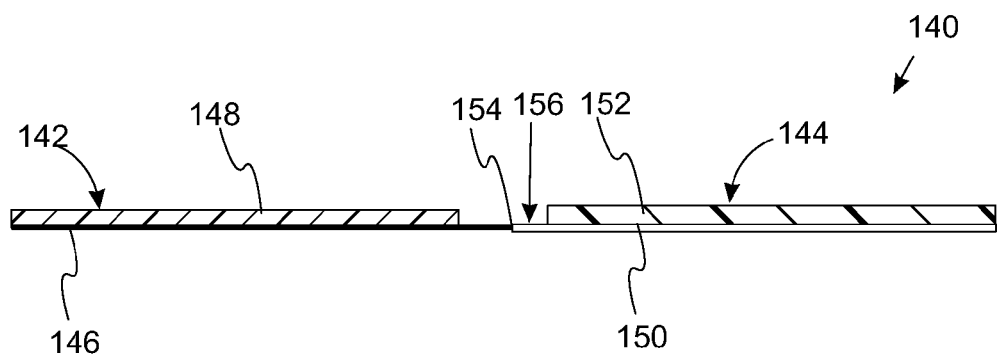
FIG. 2D is a variation in which a single side of the anode and a single side of cathode are coated with an electrode active layer.

FIG. 2D provides a variation in which a single side of the anode and a single side of the cathode are coated with an electrode active layer. Compound electrode 140 includes anode section 142 and cathode section 144. Anode section 142 includes anode metal sheet 146 over-coated with anode active layer 148 on a single side. Cathode section 144 includes cathode metal sheet 150 over-coated with cathode active layer 152 on a single side. Metal sheets 146 and 150 are attached together (e.g., by welding) at position 154 to form compound metal sheet 156.

Each of the electrode designs of FIGS. 2A-2D includes a compound metal sheet in which an anode metal sheet is attached to a cathode metal sheet. In one refinement, the anode metal sheet comprises copper and the cathode metal sheet comprises aluminum. In another refinement, the compound metal sheet may be constructed from a single metal sheet which is coated with a layer of a different metal. For example, an aluminum sheet is partially coated with a copper layer such that the uncoated aluminum portion functions as the cathode metal sheet and the copper coated portion functions as the anode metal sheet. In another example, a copper sheet is partially coated with an aluminum layer such that the uncoated copper portion functions as the anode metal sheet and the aluminum coated portion functions as the cathode metal sheet.

As set forth above, the metal sheet of the anode portion is coated with an anode active layer. In one refinement useful for lithium ion battery assemblies, the anode active layer is a carbon-containing layer. Examples of suitable carbon-containing layers include, but are not limited to, a component selected from the group consisting of graphite, coke, and combinations thereof.

As set forth above, the metal sheet of the cathode portion is coated with a cathode active layer. In one refinement useful for lithium ion battery assemblies, the cathode active layer is a lithium-containing layer. In one refinement, the lithium-containing layer comprises a lithium transition metal oxide. Examples of suitable transition metal oxides include, but are not limited to, $LiMn_2O_4$, $LiCoO_2$, $LiNiO_2$, and combinations thereof.

Figure 3:
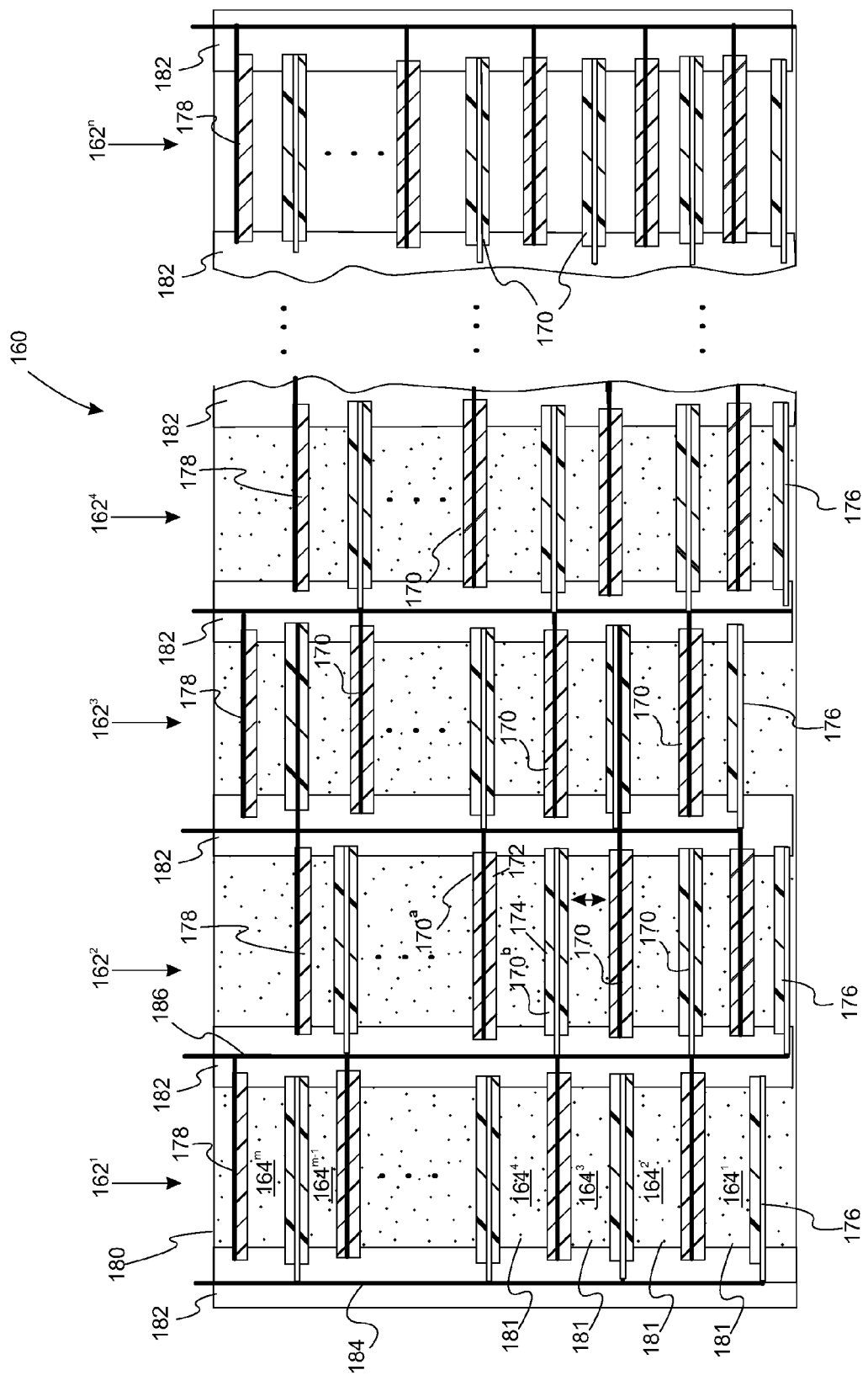
FIG. 3 is a schematic cross section of a battery assembly comprising a plurality of battery sections.

With reference to FIG. 3, a schematic cross section of a battery assembly comprising a plurality of battery sections is provided. In general, the battery assembly includes a plurality of battery sections defined by the compound electrodes arranged such that the anode section and cathode sections of each compound electrode is positioned in adjacent battery sections. The enclosed volumes of the battery sections are electrically connected by the compound electrodes set forth above. In FIG. 3, a battery assembly having three battery sections in series is illustrated. Battery assembly 160 includes n battery sections $\mathbf{162}^1$ to $\mathbf{162}^n$ where n is an integer that is at least 2. Typically, n is from 2 to about 200. Each of battery sections $\mathbf{162}^1$ to $\mathbf{162}^n$ includes a plurality of battery cells (i.e., electrochemical cells) formed as enclosed cells. For example, battery section 162 includes m battery cells $\mathbf{164}^1$ to $\mathbf{164}^m$ where m is an integer providing the number of battery cells in battery section $\mathbf{162}^1$. Typically, n is from 2 to about 200.

Still referring to FIG. 3, each battery cell includes compound electrode plates 170 in which both sides of the anode section and both sides of the cathode section are coated with an electrode active layer. Moreover, each battery cell includes at least a first electrode plate and a second electrode plate arranged such that an anode section of the first electrode plate aligns with the cathode section of the second electrode plate. For example, anode section 172 of electrode plate $\mathbf{170}^a$ opposes and aligns with cathode section 174 of electrode plate $\mathbf{170}^b$. Electrode plate $\mathbf{170}^a$ and electrode plate $\mathbf{170}^b$ are arranged such that the anode section and the cathode section of each electrode plate are positioned in adjacent battery sections. The battery sections also include end cathode plates 176 and end anode plates 178. Compound electrode plate 180 is also depicted in FIG. 3. Electrolyte 181 is disposed between the electrode plates in each battery cell. Battery assembly 160 also includes enclosure 180 and racks 182. In a refinement, each of enclosure 180 and racks 182 are plastic. In another refinement, battery assembly 160 also includes a cooling system (not shown).

In the battery design of FIG. 3, the battery subsections are configured such that the anodes of each battery cell are electrically connected. Similarly, the battery subsections are configured such that the anodes of each battery cell are electrically connected. For example, in battery section $\mathbf{162}^1$, the anodes of battery cells $\mathbf{164}^1$ to $\mathbf{164}^m$ are electrically connected via bus 184 while the cathodes are connected via bus 186. The battery design of FIG. 3 is such that the anodes of a battery section are electrically connected with the cathodes of the adjacent battery section. For example, the cathodes of battery section $\mathbf{162}^2$ are electrically connected by bus 184.

The battery assemblies set forth above all utilize battery cells that contain an electrolyte. For lithium ion battery cells, the electrolyte comprises lithium ions. In one variation, the electrolyte is a liquid. In another variation, the electrolyte is a solid. Typically, the liquid electrolytes are non-aqueous solutions of a lithium salt and solvent. Suitable solvents include, but are not limited to, esters, ethers, and carbonates (e.g., ethylene carbonate or diethyl carbonate). Suitable lithium salts include, but are not limited to, non-coordinating anion salts (e.g. lithium hexafluorophosphate ($LiPF_6$), lithium hexafluoroarsenate monohydrate ($LiAsF_6$), lithium perchlorate ($LiClO_4$), lithium tetrafluoroborate (LiBF4), and lithium triflate ($LiCF_3SO_3$).)

Figure 4:
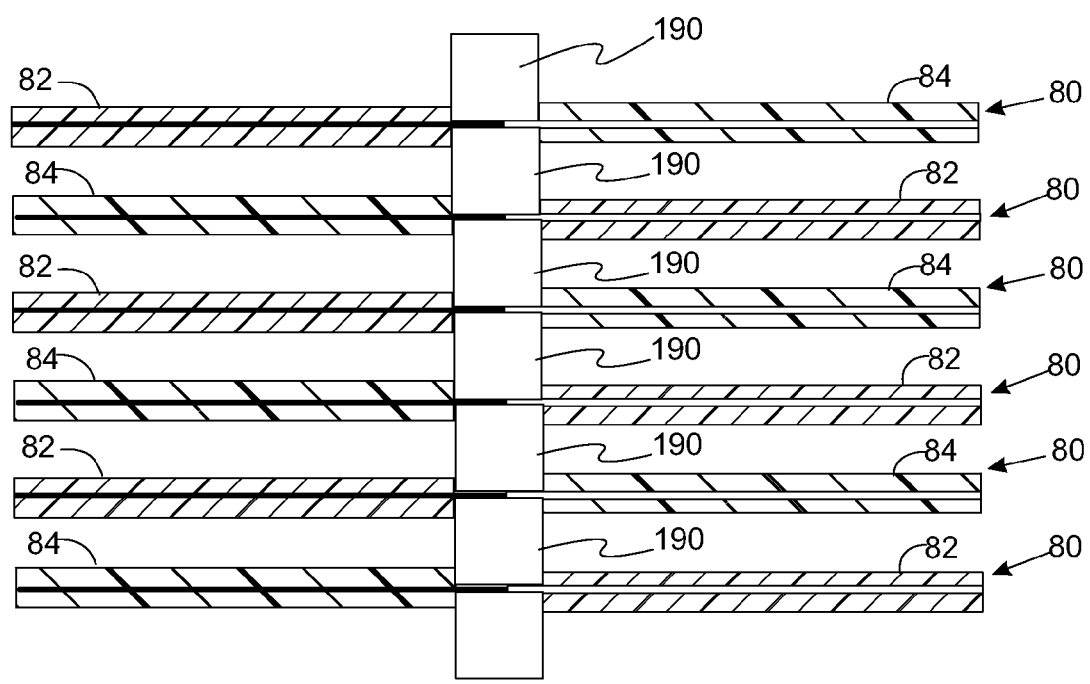
FIG. 4 is a schematic cross section illustrating sealing between battery cells.

With reference to FIG. 4, a schematic illustrating sealing between battery cells is provided. Each of the individual battery cells of the assembly of FIG. 3 are physically isolated by separating elements (i.e., seals) attached to the compound electrodes. In a variation, the separating elements extend over the entire boundary formed between the anode and cathode sections of the compound electrodes. In general, the separating elements prevent electrical contact between the electrolyte in the adjacent battery sections. In FIG. 4, compound electrode plates 80 are assembled with seal 190 positioned between adjacent plates. Examples of such seals include, but are not limited to, polymer films or blocks, O-ring type seals or rubber gaskets, Ziplock type seals (e separating elements have complementary inserting and receiving shapes). and the like. In a refinement, such seals are formed from electrically conductive polymers. In this latter refinement, the electrically conductive polymers partially form the buses (i.e., bus 184 and 186) connecting the electrodes together in FIG. 3.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A battery assembly comprising a plurality of battery sections and compound electrodes, each battery section:
    a first compound electrode plate and a second compound electrode plate,
        the first compound electrode plate and the second compound electrode plate each individually comprising a copper plate and an aluminum plate,
        the copper plate being attached to the aluminum plate, the copper plate defining an anode section and being coated with an anode active layer;
        the aluminum plate defining a cathode section and being coated with a cathode active layer, the first compound electrode plate and the second compound electrode plate arranged such that the anode section of the first compound electrode plate aligns with the cathode section of the second compound electrode plate; and
    an electrolyte disposed between the first compound electrode plate and the second compound electrode plate.

2. The battery assembly of claim 1 wherein the battery sections define enclosed volumes.

3. The battery assembly of 2 wherein the enclosed volumes of the battery sections are electrically connected by the compound electrodes.

4. The battery assembly of claim 1 wherein the battery sections are formed by separating elements attached to the compound electrodes.

5. The battery assembly of claim 4 wherein the separating elements extend over an entire boundary between the anode and cathode sections of the compound electrodes.

6. The battery assembly of claim 4 wherein the separating elements are rubber gaskets.

7. The battery assembly of claim 4 wherein the separating elements have complementary inserting and receiving shapes.

* * * * *